United States Patent
Maeda et al.

(10) Patent No.: US 6,793,847 B2
(45) Date of Patent: Sep. 21, 2004

(54) LIQUID CRYSTAL POLYESTER RESIN COMPOSITION, PROCESS FOR PRODUCING THE SAME, AND MOLDED ARTICLE THEREOF

(75) Inventors: Mituo Maeda, Tsukuba (JP); Satoshi Nagano, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/824,229

(22) Filed: Apr. 3, 2001

(65) Prior Publication Data

US 2002/0017631 A1 Feb. 14, 2002

(30) Foreign Application Priority Data

Apr. 4, 2000 (JP) .................................. 2000-101869

(51) Int. Cl.[7] .............................................. C09K 19/52
(52) U.S. Cl. ........................... 252/299.01; 252/299.67; 524/495
(58) Field of Search ..................... 252/299.01, 299.67; 524/496, 495, 546

(56) References Cited

U.S. PATENT DOCUMENTS 5,428,100 A * 6/1995 Asai et al. .................. 524/496
5,976,406 A * 11/1999 Nagano et al. ......... 252/299.01

* cited by examiner

*Primary Examiner*—Mark F. Huff
*Assistant Examiner*—Jennifer R. Sadula
(74) *Attorney, Agent, or Firm*—Birch, Stewart, Kolasch & Birch, LLP

(57) ABSTRACT

Provided is a liquid crystal polyester resin composition, which comprises 5–20 parts by weight of glass fiber having a specific number average fiber diameter and fiber length after molding and 100 parts by weight of a specific liquid crystal polyester resin, and the flexural modulus thereof measured with using a test piece of 0.5 mm thickness is 25 GPa or more; and also provided a process for producing a molded article therefrom. The liquid crystal polyester resin composition is low in specific gravity, and is excellent in processability, mechanical properties, and heat resistance.

17 Claims, 1 Drawing Sheet

LIQUID CRYSTAL POLYESTER RESIN COMPOSITION, PROCESS FOR PRODUCING THE SAME, AND MOLDED ARTICLE THEREOF

BACKGROUND OF THE INVENTION

1. Field of the Invention

The present invention relates to a liquid crystal polyester resin composition.

2. Description of Related Art

Because of their excellent thermal resistance and mechanical physical properties as well as their excellent flowability in molten state, i.e., processability, melt liquid crystallinity polyester resins that exhibit liquid crystallinity in molten state (hereinafter, such resin is referred to as liquid crystal polyester resin) have been used in various fields as molding materials which can be subjected to precise molding. In recent years, in the electric and electronic fields where liquid crystal polyester resins are used very often, downsizing, lightening, high-speed processing and energy saving are more and more required for products represented by cellular phone parts and optical disc pickup parts. Following this, more light-weight (low specific gravity) resins have been required as materials having necessary mechanical physical properties and processability.

Since an injection molded article of a liquid crystal polyester resin alone has strong anisotropy, the molding is difficult, and usually it is used as a composite material added with inorganic fillers, such as glass fiber. As for a glass fiber containing liquid crystal polyester resin composition, for example, JP-B 1-27103 discloses that glass fibers having a specific fiber diameter and fiber length are excellent in respect of the balance between moldability and physical properties. JP-B 7-68409 discloses the mixing two kinds of glass fibers having different mean fiber lengths, in a specific ratio. JP-A 4-292651 discloses glass fiber having specific weight average fiber length and specific number average fiber length. Moreover, JP-A 63-101448 discloses compounding glass fibers having ten or more of the aspect ratio, and 0.15 to 0.6 mm of the fiber length.

JP-A 6-240114 discloses glass fibers having a specific fiber length distribution.

It is more advantageous generally to add much of such glass fibers, in order to reduce the anisotropy, and commercial liquid crystal polyester resin compositions for injection molding contain 20 to 50 wt %. However, as for that containing much amount of glass fibers, the specific gravity as a liquid crystal polyester resin composition becomes large, it has already become difficult to use it, in the field where a light weight property is required, An object of the present invention is to solve the above-mentioned problem, and to provide: a liquid crystal polyester resin composition which is low in specific gravity, and excellent in processability, mechanical properties, and heat resistance; a process for producing the same; and a molded article using thereof.

SUMMARY OF THE INVENTION

As a result of extensive studies, the present inventors have found that a specific liquid crystal polyester resin having low specific gravity, and excellent processability and mechanical properties can be obtained by compounding a specific amount of glass fibers having a specific number average fiber diameter and a specific number average fiber length, thus completed the present invention.

Namely, the present invention relates to [1] a liquid crystal polyester resin composition, which comprises 5–20 parts by weight of glass fiber having a number average fiber diameter after molding of 2–20 μm, and a number average fiber length after molding of 210–500 μm; and 100 parts by weight of a liquid crystal polyester resin containing the following structural units (I), (II), and (III), or the following structural units (I), (II), (III) and (IV); and the sum of (I), (II), (III) and (IV) is 95% by mole or more, and the flexural modulus thereof measured using a test piece of 0.5 mm thickness is 25 GPa or more.

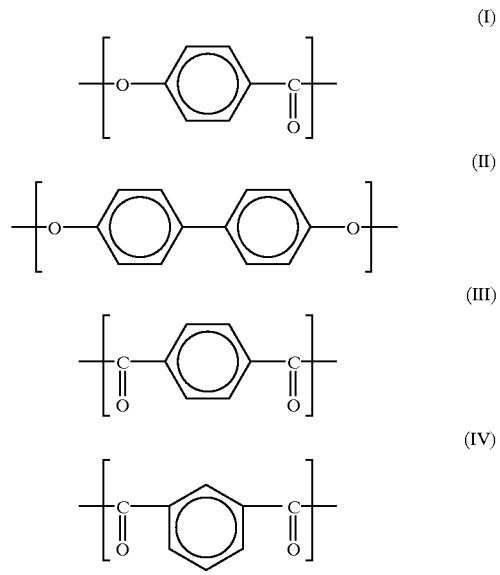

The present invention also relates to [2] a molded article obtained by using the liquid crystal polyester resin composition of the above [1].

Further, the present invention relates to [3] a process for producing a polyester resin composition of [1], wherein a melt-kneading extruder equipped with a screw is used and the extruder has an upper stream side supplying portion at the upper stream part of the extrusion direction, and a lower stream side supplying portion at the lower stream part from the upper stream side supplying portion, and the ratio (L/D) of the distance (L) between the upper stream side supplying portion and the lower stream side supplying portion to the diameter (D) of a screw is 4–30 (L and D are the same scale units); and under screw rotation, 90% or more of the total supplying amount of the liquid crystal polyester resin and less than 5% of the total supplying amount of the glass fiber are supplied from the upper stream side supplying portion, and less than 10% of the total supplying amount of the liquid crystal polyester resin and 95% or more of the total supplying amount of the glass fiber are supplied from the lower stream side supplying portion.

Figure 1:
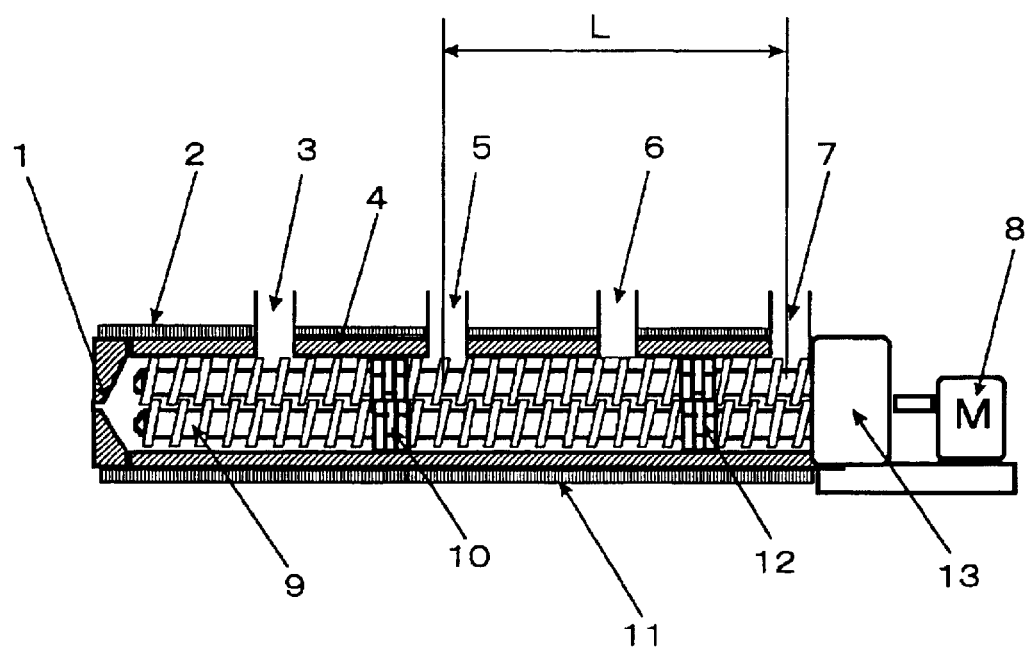
FIG. 1 is a cross sectional view of a melt kneading extruder. The denotation used in the FIGURE are as follows.

1: Nozzle
2: Heater
3: Vent
4: Cylinder
5: Lower stream side supplying portion

6: Vent
7: Upper stream side supplying portion
8: Motor
9: Screw (screw diameter: D)
10: Kneading section
11: Heater
12: Kneading section
13: Change gear
L: Distance between upper stream side supplying portion and lower stream side supplying portion

DETAILED DESCRIPTION OF THE INVENTION

The liquid crystal polyester resin used by the present invention contains the above-mentioned structural units (I), (II) and (III), or the above-mentioned structural units (I), (II), (III) and (IV), and the sum of (I), (II), (III) and (IV) is 95% by mole or more. Although it is also possible to add other structural units in the range not exceeding 5% by mole, in view of balance between heat resistance and processability, it is necessary to keep it to less than 5% by mole. As other structural units, they are suitably selected from (1) aromatic hydroxycarboxylic acid, (2) aromatic dicarboxylic acid, and (3) aromatic diol.

Among them, it is preferable that the amounts of the structural units based on the sum of the structural units (I), (II), (III) and (IV) in the liquid crystal polyester resin are in a range of 40–80% by mole of the above-mentioned (I), and 10–30% by mole of (II); and (II)/((III)+(IV))=0.9–1.1 and (IV)/((III)+(IV))=0–0.5.

When the liquid crystal polyester resin contains less than 40% by mole of (I), the heat resistance may not be sufficient, and in case of 80% by mole or more, processability may be inferior. Suitably, (I)=45–65% by mole, and more suitably (I)=45–55% by mole. When the liquid crystal polyester resin contains less than 10% by mole of (II), processability may be inferior, and in case of more than 30% by mole, heat resistance may not be sufficient.

When (II)/((III)+(IV)) is less than 0.9 or more than 1.1, then the degree of polymerization of a liquid crystal polyester resin may be insufficient, and physical properties may fall. The liquid crystal polyester resin in which 198(IV)/((III)+(IV)) exceeds 0.5 may not have enough heat resistance.

As the process for producing the liquid crystal polyester resin used by the present invention can be adopted a well-known method. For example, it is described in the above-mentioned JP-B 47-47870, JP-B 63-3888, etc.

The flow temperature of a liquid crystal polyester resin defined below, in view of the balance between processability and heat resistance, is suitably 320° C. to 400° C., and more suitably 360° C. to 390° C. When the flow temperature is less than 320° C., heat resistance may be insufficient. Flow temperature: a temperature at which the melt viscosity shows 48000 poise when a heated resin is extruded through a nozzle having an inner diameter of 1 mm and a length of 10 mm under a load of 100 kgf/cm² (9.81 MPa) at a temperature-rising rate of 4° C./minute using a Koka type Flow Tester CFT-500 produced by Shimadzu Corporation.

The glass fiber used in the present invention means glass consisting of silicate as a main component which is processed into fibrous shape. Examples of the glasses include general alkali glass (A-glass), chemical acid-resistant glass (C-glass), low-density glass (D-glass), borosilicate glass (E-glass). E-glass is suitably used in the present invention. In the production of the glass fiber, a method of spinning glass in molten state (not less than 1300° C.) is generally used.

The glass fibers can be used with being processed, according to requirements, with surface treatment agents, such as a silane type coupling agent or a titanium type coupling agent. Further, glass fibers whose part or all of the surfaces are coated with cured or un-cured thermosetting resin can be used according to requirements.

The number average fiber diameters of the glass fiber is 2–20 μm, and suitably 5–14 μm. When the number average fiber diameter is less than 2 μm, the handling is difficult, and when larger than 20 μm, satisfactory performance may not be obtained as a liquid crystal polyester resin composition These are usually sold in the form of several millimeter fiber length, but cut in a process of granulation or molding. The number average fiber length after molding should be controlled to 210–500 μm, suitably 250–400 μm, and more suitably 300–350 μm. When it is shorter than 210 μm, it is difficult to obtain a composition having high rigidity and low anisotropy aimed by the present invention. When it is longer than 500 μm, the compound is inferior in respect of flowability and processability.

In order to keep the number average fiber length after molding in the above-mentioned range, the number average fiber length of glass fibers in a resin composition before molding is appropriately about 50 cm longer than the expected number average fiber length after molding.

The amount of glass fiber to be contained is from 5–20 parts by weight to 100 parts by weight of the liquid crystal polyester resin. When it is less than 5 parts by weight, it is difficult to reduce the anisotropy of the liquid crystal polyester resin composition, and when more 20 parts by weight, it will become outside the meaning of the present invention referred to a low specific gravity composition.

The flexural modulus measured with the test piece of 0.5 mm thickness obtained by molding the liquid crystal polyester resin composition of the present invention is 25 GPa or more.

The compounding means of the raw materials for obtaining the liquid crystal polyester resin composition of the present invention is not limited. In general, a liquid crystal polyester resin, glass fiber, and according to requirements, inorganic filler, release modifier, heat stabilizer, etc. are mixed with using a Henschel mixer, a tumbling mixer, etc.

In the present invention, small amount of other fillers than glass fiber can be added to the liquid crystal polyester resin as required. Examples of such fillers include: fibrous shape or needle-like reinforcers such as silica alumina fiber, wollastonite, carbon fiber, potassium titanate whisker, aluminum borate whisker, and titanium oxide whisker; and inorganic fillers, such as calcium carbonate, delomite, talc, mica, clay, glass beads, etc. These can be used alone or in combination of two or more.

To the liquid crystal polyester resin of the present invention can be added are usual additives including: colorants such as dye and pigment; antioxidant; heat stabilizer; ultraviolet absorber; antistatic agent; and surfactant, alone or in combination of two or more within the range which does not injure the purpose of the present invention.

Moreover, to the liquid crystal polyester resin of the present invention can be added are: small amount of other thermoplastic resins such as, for example, polyamide, polyester, polyphenylene sulfide, polyether ketone, polycarbonate, polyphenylene ether and a modified product thereof, polysulfone, polyether sulfone, polyether imide, etc.; and small amount of thermosetting resins such as, for example, phenol resin, epoxy resin, polyimide resin, etc. alone or in combination of two or more.

In order to obtain the liquid crystal polyester resin composition of the present invention, it is possible with a usual granulating machine or a molding machine, but suitably with a melt-kneading extruder equipped with a screw and has an upper stream side supplying portion at the upper stream part of the extrusion direction, and a lower stream side supplying portion at the lower stream part from said upper stream side supplying portion, and the ratio (L/D) of the distance (L) between said upper stream side supplying portion and said lower stream side supplying portion to the diameter (D) of a screw is 4–30 (L and D are the same scale units). With using said extruder, it is preferable that, under screw rotation, 90% or more of the total supplying amount of the liquid crystal polyester resin and less than 5% of the total supplying amount of the glass fiber are supplied from the upper stream side supplying portion, and less than 10% of the total supplying amount of the liquid crystal polyester resin and 95% or more of the total supplying amount of the glass fiber are supplied from the lower stream side supplying portion.

When L/D is less than 4, kneading of the liquid crystal polyester resin becomes insufficient, and the number average fiber length of glass fiber may become short. When L/D is more than 30, the liquid crystal polyester resin may be deteriorated, and the physical properties may fall.

When the supplying amount of the liquid crystal polyester resin from the upper stream side supplying portion is less than 90% of the total supplying amount of the liquid crystal polyester resin, the number average fiber length of glass fiber may become short. When the supplying amount of glass fiber exceeds 5% of the total amount of supply of glass fiber, stable production may become difficult.

Here, the distance between the upper stream side supplying portion and the lower stream side supplying portion (L) is a distance parallel to the axis of a screw which measured between the centers of the holes of each supplying portions.

As for L/D, it is more suitably 10 to 20.

The supplying amount of the liquid crystal polyester resin from the upper stream side supplying portion is more suitably 95% or more of the total supplying amount of the liquid crystal polyester resin from the point of controlling the number average fiber length of the glass fiber.
The supplying amount of glass fiber is more suitably 0% of the total supplying amount of glass fiber from the point of production stability.
Thus cutting of glass fiber at the time of heat-melting of the liquid crystal polyester resin can be suppressed, and controlling to desired fiber length becomes easier.

In the present invention, although the upper stream side supplying portion is usually installed at the end side of the cylinder reverse to extrusion direction, it is not limited to this.

In addition, a filler additive, etc. can be supplied in the extruder from the supplying mouth installed at the suitable position of the extruder. Or they are mixed beforehand together with the thermoplastic resin and/or glass fiber and can be supplied from the upper stream side supplying portion or the lower stream side supplying portion.

As a melt kneading extruder, a single screw extruder and a twin-screw extruder are exemplified. As a twin-screw extruder, a same-direction rotation type, a reverse-direction rotation type, and an imperfect-engagement type are exemplified. Suitably used is a same-direction rotation type twin-screw extruder. Examples of the same-direction rotation type include a single-thread screw type, a double-thread screw type, and a triple-thread screw type. Examples of the reverse-direction rotation type include a parallel axis type and an inclined axis type.

Hereinafter, an embodiment of the manufacture method of the present invention is explained with reference to the drawing.

FIG. 1 is a sectional view showing an embodiment of the melt kneading extruder (twin-screw) concerning the present invention.

In cylinder 4 installed in an extruder, screw 9 are rotated by (driving) motor 8 with changing the rotation speed slowing down by change-gear 13. Cylinder 4 is heated by (outside) heater 11.

Screw 9 has kneading sections (10, 12) for kneading a liquid crystal polyester resin, or for kneading glass fibers and a liquid crystal polyester resin.

At the end side reverse to extrusion direction of cylinder 4, upper stream side supplying portion 7 for supplying 90% or more of the total supplying amount of a liquid crystal polyester resin and less than 5% of the total supplying amount of glass fiber is formed. At the lower stream side of the upper stream side supplying portion 7, lower stream side supplying portion 5 for supplying less than 10% of the total supplying amount of a liquid crystal polyester resin and 95% or more of the total supplying amount of glass fiber is formed. To the upper stream side supplying portion 7 and/or the lower stream side supplying portion 5, a constant delivery feeder (not illustrated) is installed in order to supply quantitatively a liquid crystal polyester resin and/or glass fiber.

Moreover, in order to conduct vacuum degassing using a vacuum pump, vents 3 and 6 are formed in the cylinder 4 for releasing into atmosphere. In cylinder 4, nozzle 1 is formed for extruding the melt-kneaded liquid crystal polyester resin composition. Depending also on the size of the extruder, generally it has some holes having a diameter of 2 mm to 5 mm.

The molded article obtained by using the resin composition of the present invention has low specific gravity and high flow by having reduced amount of glass fiber, comparing with the conventional liquid crystal polyester resin compositions containing more than 30 wt % of glass fibers. On the one hand, by controlling fiber length long, the flexural modulus of the thin thickness molded article is maintained as it is and the anisotropy is reduced.

The use of parts or material members molded from the resin composition of the present invention is not especially limited. Examples of them include: electric and electronic parts such as a connector, a socket, relay parts, a coil bobbin, optical pickup, an oscillator, a printed wiring board, and computer related parts; semiconductor related parts such as IC tray and a wafer carrier; home electric appliances such as VCR, television, an iron, an air-conditioner, a stereo, a cleaner, a refrigerator, a rice cooker, and illumination instruments; illumination instruments parts such as a lamp reflector and a lamp holder; acoustic goods such as a compact disc, a laser disc, and a speaker; communication apparatuses such as a ferrule for optical cables, telephone parts, facsimile parts and a modem; copying machine related parts such as a stripping finger and a heater holder; machine parts such as an impeller, a fan gear, a bearing, motor parts, and a case; automobile parts, such as a mechanical component for cars, engine parts, parts in engine room, parts for electronics, and interior parts; cooking appliances such as a pan for microwave cooking and heat-resistant tableware; heat-insulation material or sound-insulation material such as a floor material and a wall material; supporting material such as a beam, and pillar; building materials and/or construction materials such as a roof material; airplane, space machine, and parts for space machinery; parts for radiation facility, such as a nuclear reactor, parts for marine facility, jigs for cleaning, optical instrument parts, bulbs, pipes, nozzles, filters, films, medical application instrument parts and medical application material, sensors parts, sanitary goods, sporting goods, leisure goods, etc.

EXAMPLES

Hereinafter, examples of the present invention are described but the present invention is not limited to these. Physical properties of the examples were measured by the following method.

(1) Flow temperature: A temperature was measured at which the melt viscosity shows 48000 poise when a heated resin is extruded through a nozzle having an inner diameter of 1 mm and a length of 10 mm under a load of 100 kgf/cm$^2$ (9.81 MPa) at a temperature-rising rate of 4° C./minute using a Koka type Flow Tester CFT-500 produced by Shimadzu Corporation.

(2) Number average fiber length and number average fiber diameter of glass fiber after molding: A test piece of ASTM No. 4 (molded article thickness of 2.5 mm) was used and made into ash by treating at 600° C. for 2 hours with an electric furnace. Resultant glass fiber was enlarged with a diascope (50 or 20 times magnification for the number average fiber length, and 100 times magnification for the number average fiber diameter), and a photograph was taken. And then, fiber length and fiber diameter were measured for about 500 glass fibers.

(3) Specific gravity: it was measured according to ASTM D792 (23° C.) with using ASTM No. 4 dumbbell.

(4) Bending strength: It was measured according to ASTM D790. with using a test piece having a length of 127 mm, a width of 12.7 mm, and a thickness of 6.4 mm.

(5) Flexural modulus: It was measured according to ASTM D790 with using a dumbbell test piece (0.5 mm in thickness) of JIS 1(7113 (½) by 20 mm span length.

(6) Heat distortion temperature under load: It was measured according to ASTM D648 under the load of 1.85 Mpa, with using a molded test piece having a length of 127 mm, a width of 12.7 mm, and a thickness of 6.4 mm.

Examples 1–2 and Comparative Examples 1–5

Each following components in a composition shown in Table 1, was pelletized at a cylinder temperature of 380° C., and a screw speed of 150 rpm with using a same-direction rotation twin-screw kneading extruder (PMT47 produced by IKG Corporation.), and pellets of the liquid crystal polyester resin composition was obtained.

Liquid Crystal Polyester Resin:

A liquid crystal polyester resin [specific gravity 1.38] comprising the above-mentioned structural units (I), (II), (III) and (IV), the molar ratio (I):(II):(III):(IV) of 50:25:23.75:1.25 and having a flow temperature of 380° C.

Glass Fiber: Chopped Glass Fiber (trade name: CS03JAPX-1, produced by Asahi fiber glass)

Glass Fiber: Milled Glass Fiber (trade name: REV-8, produced by Nippon Sheet Glass).

In the above-mentioned twin-screw extruder, the supply zones were made in two portions, one was in an upper stream part of the screw and the other was at the lower stream part by distance L of the screw to that of the upper stream part. L/D=14 (D shows the diameter of the screw, and D and L are the same scale units here).

In Examples 1 and 2 and Comparative Examples 1–5, whole quantity of the liquid crystal polyester resin was supplied from the upper stream part supplying zone, and whole quantity of glass fiber was supplied from the lower stream part supplying zone.

Using resultant pellets, injection molding is performed at a cylinder temperature of 400° C., and a mold temperature of 130° C., with an injection molding machine (PS40E5ASE type, produced by Nissei Plastic Industrial). Test pieces were obtained and the above-mentioned measurements were performed. The result are shown in Table 1.

The liquid crystal polyester resin composition of the present invention is excellent in processability. The molded article obtained has low specific gravity, and is excellent in mechanical properties and heat resistance, and is useful as a material such as for electric and electronic parts.

TABLE 1

| | Liquid crystal polyester resin (parts) | Glass fiber kind of GF | Glass fiber Amount (parts) | Number average glass fiber length (μm) | Number average glass fiber diameter (μm) | Flexural modulus (0.5t) (Gpa) | Specific gravity | Bending strength (Mpa) | Heat distortion temperature under load (° C.) |
|---|---|---|---|---|---|---|---|---|---|
| Example 1 | 100 | chopped GF | 11.1 | 348 | 10 | 29.7 | 1.45 | 127 | 354 |
| Comparative Example 1 | 100 | chopped GF | 25.0 | 305 | 10 | 30.1 | 1.52 | 140 | 354 |
| Comparative Example 2 | 100 | chopped GF | 42.8 | 310 | 10 | 30.3 | 1.60 | 152 | 355 |
| Comparative Example 3 | 100 | chopped GF | 66.7 | 116 | 10 | 31.0 | 1.69 | 127 | 339 |
| Comparative Example 4 | 100 | milled GF | 11.1 | 89 | 10 | 24.5 | 1.45 | 126 | 338 |
| Comparative Example 5 | 100 | milled GF | 25.0 | 85 | 10 | 24.2 | 1.52 | 128 | 337 |
| Comparative Example 6 | 100 | milled GF | 42.8 | 83 | 10 | 23.8 | 1.69 | 127 | 335 |

What is claimed is:

1. A liquid crystal polyester resin composition, which comprises 5–15 parts by weight of glass fiber having a number average fiber diameter after molding of 2–20 μm, and a number average fiber length after molding of 210–500 μm; and 100 parts by weight of a liquid crystal polyester resin containing the following structural units (I), (II) and (III), or the following structural units (I), (II), (III) and (IV); and the sum of (I), (II), (III) and (IV) is 95% by mole or more,

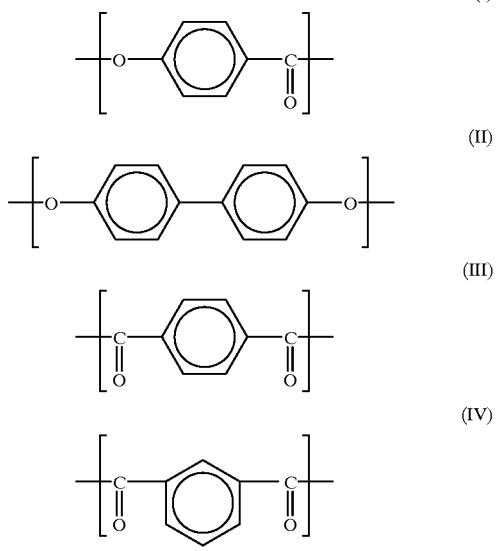

and the flexural modulus thereof measured with using a test piece of 0.5 mm thickness is 25 GPa or more.

2. The liquid crystal polyester resin composition according to claim 1, wherein the amounts of the structural units based on the sum of the structural units (I), (II), (III) and (IV) in the liquid crystal polyester resin are in a range of 40–80% by mole of the above-mentioned (I), and 10–30% by mole of (II); and (II)/((III)+(IV))=0.9 to 1.1 and (IV)/((III)+(IV))=0 to 0.5.

3. The liquid crystal polyester resin composition according to claim 1 or 2, wherein the flow temperature of the liquid crystal polyester resin defined is 320° C. or more, here the Flow temperature is a temperature at which the melt viscosity shows 48000 poise when a heated resin is extruded through a nozzle having an inner diameter of 1 mm and a length of 10 mm under a load of 100 kgf/cm² (9.81 MPa) at a temperature-rising rate of 4° C./minute using a Koka type Flow Tester CFT-500 produced by Shimadzu Corporation.

4. A molded article obtained by using the liquid crystal polyester resin composition according to claim 1.

5. A process for producing a polyester resin composition of claim 1, wherein a melt-kneading extruder equipped with a screw is used and the extruder has an upper stream side supplying portion at the upper stream part of the extrusion direction, and a lower stream side supplying portion at the lower stream part from said upper stream side supplying portion, and the ratio (L/D) of the distance (L) between said upper stream side supplying portion and said lower stream side supplying portion to the diameter (D) of a screw is 4–30 (L and D are the same scale units); and under screw rotation, 90% or more of the total supplying amount of the liquid crystal polyester resin and less than 5% of the total supplying amount of the glass fiber are supplied from the upper stream side supplying portion, and less than 10% of the total supplying amount of the liquid crystal polyester resin and 95% or more of the total supplying amount of the glass fiber are supplied from the lower stream side supplying portion.

6. The process of claim 5, wherein the L/D is 10 to 20.

7. The liquid crystal polyester resin composition according to claim 1, wherein the glass fiber comprises at least one selected from the group consisting of alkali glass, chemical acid-resistant glass, low density glass and borosilicate glass.

8. The liquid crystal polyester resin composition according to claim 1, wherein the glass fiber has been treated with a saline coupling agent or a titanium coupling agent.

9. The liquid crystal polyester resin composition according to claim 1, wherein the glass fiber has the number average fiber length after molding of 250–400 μm.

10. The liquid crystal polyester resin composition according to claim 1, wherein the glass fiber has the number average fiber length after molding of 300–350 μm.

11. The liquid crystal polyester resin composition according to claim 1, wherein the composition further comprises a fibrous reinforcer selected from the group consisting of silica alumina fiber, wollastonite, carbon fiber, and potassium titanate whisker.

12. The liquid crystal polyester resin composition according to claim 1, wherein the composition further comprises an inorganic filter selected from the group consisting of calcium carbonate, dolomite, talc, mica, clay and glass beads.

13. The liquid crystal polyester resin composition according to claim 1, wherein the composition further comprises at least one of a colorant, an antioxidant a heat stabilizer, an ultraviolet absorber, an antistatic agent or a surfactant.

14. The liquid crystal polyester resin composition according to claim 1, wherein the composition further comprises at least one thermoplastic or thermosetting resin selected from the group consisting of polyamide, polyester, polyphenylene sulfide, polyether ketone, polycarbonate, polyphenylene ether, polysulfone, polyether sulfone, polyether imide, phenol resin, epoxy resin and polyimide resin.

15. The liquid crystal polyester resin composition according to claim 1, wherein the glass fiber has the number average fiber diameter after molding of 5–14 μm.

16. The liquid crystal polyester resin composition according to claim 1, wherein the composition has a specific gravity of less than about 1.5.

17. A liquid crystal polyester resin composition, which comprises 5–11.1 parts by weight of glass fiber having a number average fiber diameter after molding of 2–20 m, and a number average fiber length after molding of 210–500 m; and 100 parts by weight of a liquid crystal polyester resin containing the following structural units (I), (II) and (III), or the following structural units (I), (II), (III) and (IV); and the sum of (I), (II), (III) and (IV) is 95% by mole or more,

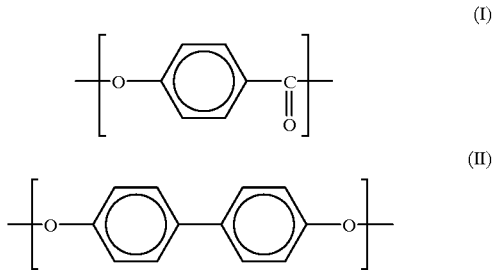

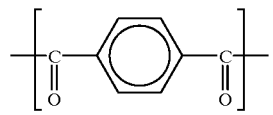 (III)
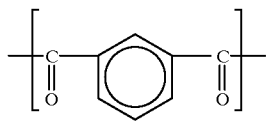 (IV)
and the flexural modulus thereof measured with using a test piece of 0.5 mm thickness is 25 GPa or more.
* * * * *